United States Patent
Singh et al.

(10) Patent No.: US 11,980,211 B2
(45) Date of Patent: May 14, 2024

(54) VERBASCOSIDE AND RELATED COMPOUNDS FOR SWEETNESS ENHANCEMENT

(71) Applicant: International Flavors & Fragrances Inc., New York, NY (US)

(72) Inventors: Ajay Pratap Singh, Union Beach, NJ (US); Hassan Mustaq Ubaideen, Union Beach, NJ (US); Jung-A Kim, Union Beach, NJ (US); Xiao-Qing Tang, Union Beach, NJ (US); Hsi-Wen Chin, Union Beach, NJ (US); Michelle Eve Huber, Union Beach, NJ (US); Xiaodong Li, Union Beach, NJ (US); Thumpalasseril V. John, Union Beach, NJ (US)

(73) Assignee: International Flavors & Fragrances, Union Beach, NJ (US)

( * ) Notice: Subject to any disclaimer, the term of this patent is extended or adjusted under 35 U.S.C. 154(b) by 673 days.

(21) Appl. No.: 17/274,606

(22) PCT Filed: Jul. 12, 2019

(86) PCT No.: PCT/US2019/041602
§ 371 (c)(1),
(2) Date: Mar. 9, 2021

(87) PCT Pub. No.: WO2020/014610
PCT Pub. Date: Jan. 16, 2020

(65) Prior Publication Data
US 2022/0046970 A1    Feb. 17, 2022

Related U.S. Application Data

(60) Provisional application No. 62/813,466, filed on Mar. 4, 2019, provisional application No. 62/697,012, filed on Jul. 12, 2018.

(51) Int. Cl.
*A23L 29/30* (2016.01)
*A23L 27/00* (2016.01)

(52) U.S. Cl.
CPC ............... *A23L 29/30* (2016.08); *A23L 27/88* (2016.08)

(58) Field of Classification Search
None
See application file for complete search history.

(56) References Cited

U.S. PATENT DOCUMENTS

2011/0144040 A1    6/2011    Wells

FOREIGN PATENT DOCUMENTS

| CN | 101589808 A | * | 12/2009 | ............... A23L 1/29 |
| CN | 105360839 A | * | 3/2016 | ............... A23L 2/02 |
| CN | 106262802 A | | 1/2017 | |
| CN | 107279628 A | | 10/2017 | |
| EP | 2340808 A1 | * | 7/2011 | ........... A61K 31/196 |
| EP | 2805722 A1 | | 11/2014 | |
| WO | 2015063736 A1 | | 5/2015 | |

OTHER PUBLICATIONS

Alipieva, et al. "Verbascoside—A review of its occurrence, biosynthesis and pharmacological significance". Available online from Biotechnology Advances, 32, 2014, 1065-1076. (Year: 2014).*
Machine translation of CN105360839, published Mar. 2, 2016. pp. 1-7. (Year: 2016).*
Machine translation of CN101589808, published Dec. 2, 2009. pp. 1-29. (Year: 2009).*
International Preliminary Report on Patentability in PCT/US2019/041602 dated Jan. 12, 2021.
International Search Report and Written Opinion in PCT/US2019/041602 dated Oct. 25, 2019.
Kaneda, N. et al. (1992) "(+)-4β-Hydroxyhernandulcin, A New Sweet Sesquiterpene from the Leaves and Flowers of Lippia dulcis," Journal of Natural Products 55(8):1136-1141.
Ramirez, E., et al. (2016) "Oleuropein hydrolysis in natural green olives: importance of the endogenous enzymes," Food Chemistry 206:204-9.

* cited by examiner

*Primary Examiner* — Jenna A Watts

(57) ABSTRACT

The use of verbascoside or a related compound thereof to enhance the sweetness of a sweetness modifier and to decrease the amount of a sweetness modifier used in a consumable is provided.

7 Claims, No Drawings

VERBASCOSIDE AND RELATED COMPOUNDS FOR SWEETNESS ENHANCEMENT

This application is the national phase under 35 U.S.C. § 371 of PCT International Application No. PCT/US2019/041602, filed Jul. 12, 2019, which claims priority of U.S. Provisional Application Nos. 62/697,012 filed Jul. 12, 2018 and 62/813,466 filed Mar. 4, 2019, teachings of each of which are herein incorporated b reference in their entirety.

BACKGROUND OF INVENTION

Reducing sugar content in food and beverages has become a necessity in the food industry. Food and beverage manufacturers generally use non-caloric, high-intensity sweetness modifiers, such as rebaudioside A (Reb A), aspartame, saccharin, glycosylated steviol glycosides, etc., to partially or completely replace sugar. However, these sweetness modifiers may exhibit undesirable taste attributes such as delayed onset of sweetness, bitter and astringent aftertaste, and lack of body and mouthfeel. Consequently, sweetness enhancers have become valuable tools, which reduce the use of sugar and/or sweetness modifiers, in achieving the desired sweetness intensity and mouthfeel with reduced off-taste.

Sweetness enhancers have been described in the prior art. For example, WO 2013/143822 teaches the use of adenosine as sweetness enhancer for certain sugars; EP 2606747 describes the use of deoxycholic acid or a derivative thereof for enhancing the sweetness of consumables; WO 2013/077668 describes the sweetness enhancing effect of a glycan or glycopeptide derived from soy sauce; WO 2012/107203 teaches the use of nobiletin or a derivative or a hydrate thereof as a sweetener or sweetness enhancer; WO 2009/023975 describes the use of iso-mogroside V as a sweetener and sweetness enhancer; US 2008/0242740 teaches aroma compositions of alkamides with hesperetin and/or 4-hydroxydihydrochalcones for enhancing sweet sensory impressions; and WO 2007/014879 and WO 2007/107596 respectively teach the use of hesperetin and 4-hydroxydihydrochalcones for enhancing the sweet taste of a sweet-tasting substance or sweet olfactory impression of a flavoring.

SUMMARY OF THE INVENTION

This invention provides a method of enhancing the sweetness of a sweetness modifier by adding an olfactory effective amount of verbascoside or a related compound thereof.

Verbascoside and its related compound, a structural isomer isoverbascoside, are represented by formulas set forth below:

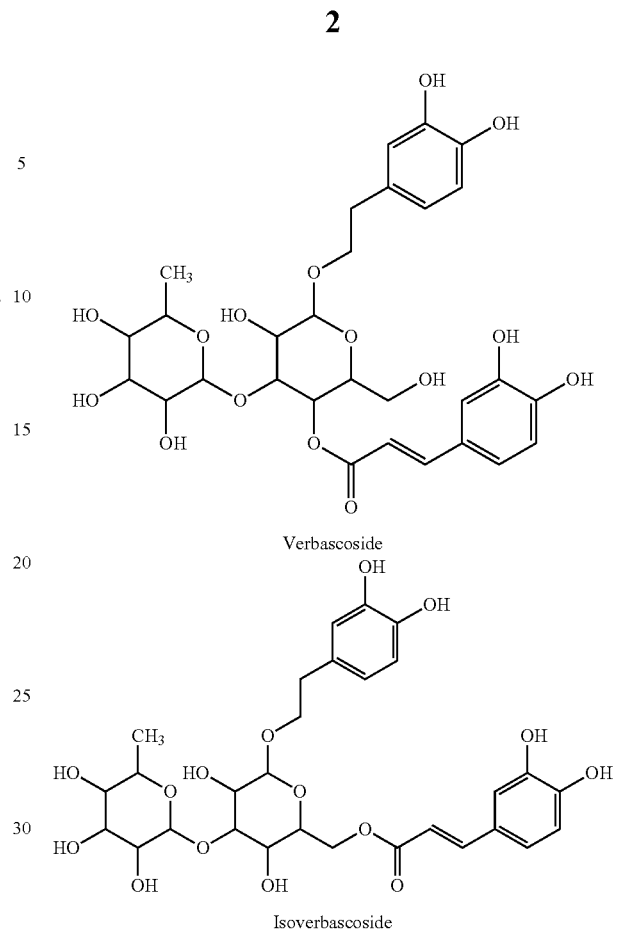

Verbascoside

Isoverbascoside

In one embodiment, the present invention is directed to a method of enhancing the sweetness of a sweetness modifier comprising the step of adding an olfactory effective amount of verbascoside or a related compound thereof.

In another embodiment, the present invention is directed to a method enhancing the sweetness of a sweetness modifier comprising the step of adding an olfactory effective amount of *Chaenomeles speciosa* leave extract.

In another embodiment, the present invention is directed to a composition comprising a sweetness modifier and an olfactory effective amount of verbascoside or a related compound thereof.

In another embodiment, the present invention is directed to a composition comprising a sweetness modifier and an olfactory effective amount of *Chaenomeles speciosa* leave extract.

In another embodiment, the present invention is directed to a consumable comprising a sweetness modifier and an olfactory effective amount of verbascoside or a related compound thereof.

In another embodiment, the present invention is directed to a consumable comprising a sweetness modifier and an olfactory effective amount of *Chaenomeles speciosa* leave extract.

These and other embodiments of the present invention will be apparent by reading the following specification.

DETAILED DESCRIPTION OF THE INVENTION

Verbascoside, (E)-2-(3,4-dihydroxyphenyl)ethyl 3-O-(6-deoxy-α-L-mannopyranosyl)-4-[3-(3,4-dihydroxyphenyl)-

2-propenoate]-β-D-Glucopyranoside; and its structural isomer isoverbascoside are naturally constituents of genus *Campsis* such as *Campsis grandiflora* (Imakura et al., Phytochemistry (1985), 24(I): 139-146), genus *Conandron* such as *Conandron ramondioides* (Nonaka et al., Phytochemistry (1977), 16(8):1265-1267), genus *Ligustrum* such as *Ligustrum expansum* (Wong et al., Journal of Agricultural and Food Chemistry (2001), 49(6): 3113-3119), genus *Lippia* such as *Lippia salviaefolia, Lippia velutina, Lippia balansae, Lippia lasiocalycina, Lippia lupulina* and *Lippia sidoides* (Funari et al., Food Chemistry (2012a), 135(3): 861-2118; Funari et al., Journal of Chromatography A (2012b), 1259:167-178), genus *Mitraria* such as *Mitraria coccinea* (Cardenas et al. Liebigs Annalen der Chemie. (1992), 7(24): 665-668), genus *Osmanthus* (CN 103768152A; CN 107094969A), *Olea* such as *Olea europaea* (Ramirez et al., Food Chemistry (2016), 1(206):204-9; Sousa et al., The Journal of the American Oil Chemists' Society (2014), 91(4): 599-611) and genus *Phyla* such as *Phyla dulcis* (Kaneda et al., Journal of Natural Products (1992), 55(8): 1136-1141).

Some of these species are used in ethnobotany worldwide as antioxidant food and antiseptic remedies such as mouth and throat infections (Wong et al., Journal of Agricultural and Food Chemistry (2001), 49(6): 3113-3119; Funari et al., Food Chemistry (2012a), 135(3): 861-2118; CN 103768152A; CN 107094969A). However, no function has ever been reported or suggested for verbascoside or isoverbascoside. Yet it is known that verbascoside is a bitter phenylpropanoid glycoside (Kaneda et al., Journal of Natural Products (1992), 55(8): 1136-1141) and has been shown to be responsible for the bitter taste in many fruits and vegetables such as fresh olives (Ramirez et al., Food Chemistry (2016), 1(206):204-9).

In the present invention, verbascoside and isoverbascoside have been for the first time identified in genus *Chaenomeles*. Further, verbascoside and isoverbascoside have also been found to possess an unexpected and advantageous use in food. In particular, verbascoside, isoverbascoside, a salt thereof or a mixture thereof has been found to enhance the sweetness of sweetness modifiers without undesirable off-notes.

Accordingly, the present invention provides a method of using verbascoside, isoverbascoside, a salt thereof or a mixture thereof to enhance the sweetness of a sweetness modifier and decrease the amount of a sweetness modifier used in a consumable.

The term "verbascoside or a related compound thereof" is understood to mean verbascoside, isoverbascoside, a salt thereof or a mixture thereof.

In the present invention, verbascoside and isoverbascoside are available commercially and can also be an isolated and purified form a botanical extract, for example, genus *Campsis* such as *Campsis grandiflora* and *Campsis radicans*, genus *Conandron* such as *Conandron minor, Conandron ramondioides* and *Conandron rhynchotechioides*, genus *Ligustrum* such as *Ligustrum amamianum, Ligustrum amurense, Ligustrum angustum, Ligustrum australianum, Ligustrum chenaultii, Ligustrum compactum, Ligustrum confusum, Ligustrum delavayanum, Ligustrum expansum, Ligustrum gracile, Ligustrum henryi, Ligustrum ibota, Ligustrum indicum, Ligustrum japonicum, Ligustrum leucanthum, Ligustrum lianum, Ligustrum liukiuense, Ligustrum longitubum, Ligustrum lucidum, Ligustrum massalongianum, Ligustrum micranthum, Ligustrum microcarpum, Ligustrum morrisonense, Ligustrum obovatilimbum, Ligustrum obtusifolium, Ligustrum ovalifolium, Ligustrum pedunculare, Ligustrum pricei, Ligustrum punctifolium, Ligustrum quihoui, Ligustrum retusum, Ligustrum robustum, Ligustrum sempervirens, Ligustrum sinense, Ligustrum strongylophyllum, Ligustrum tenuipes, Ligustrum tschonoskii, Ligustrum vulgare, Ligustrum xingrenense* and *Ligustrum yunguiense*, genus *Lippia* such as *Lippia abyssinica, Lippia alba, Lippia balansae, Lippia carterae, Lippia dulcis, Lippia durangensis, Lippia graveolens, Lippia javanica, Lippia kituiensis, Lippia lasiocalycina, Lippia lupulina, Lippia micromera, Lippia multiflora, Lippia myriocephala, Lippia palmeri, Lippia pretoriensis, Lippia rehmannii, Lippia salicifolia, Lippia salviaefolia, Lippia scaberrima, Lippia sidoides, Lippia substrigosa, Lippia thymoides* and *Lippia velutina*, genus *Olea* such as *europaea*, genus *Osmanthus* such as *Osmanthus americanus, Osmanthus armatus, Osmanthus attenuatus, Osmanthus austrocaledonicus, Osmanthus cooperi, Osmanthus cymosus, Osmanthus decorus, Osmanthus delavayi, Osmanthus didymopetalus, Osmanthus enervius, Osmanthus fordii, Osmanthus fragrans, Osmanthus gracilinervis, Osmanthus hainanensis, Osmanthus henryi, Osmanthus heterophyllus, Osmanthus insularis, Osmanthus iriomotensis, Osmanthus kaoi, Osmanthus lanceolatus, Osmanthus marginatus, Osmanthus matsumuranus, Osmanthus mexicanus, Osmanthus minor, Osmanthus monticola, Osmanthus pubipedicellatus, Osmanthus reticulatus, Osmanthus rigidus, Osmanthus scortechinii, Osmanthus serrulatus, Osmanthus suavis, Osmanthus sumatranus, Osmanthus urceolatus, Osmanthus venosus* and *Osmanthus yunnanensis*, genus *Phyla* such as *Phyla canescens, Phyla chinensis, Phyla cuneifolia, Phyla dulcis, Phyla fruticosa, Phyla lanceolata, Phyla nodiflora* and *Phyla stoechadifolia*, and genus *Chaenomeles* such as *Chaenomeles cathayensis, Chaenomeles japonica* and *Chaenomeles speciosa*.

If provided as a botanical extract, preferably the extract is enriched for verbascoside and isoverbascoside to achieve a content of about 0.01% and greater, respectively. For example, the botanical extract contains each of verbascoside and isoverbascoside from about 0.01% to about 95%, from about 0.05% to about 50% or from about 0.1% to about 10%. Unless otherwise specified, percentages (% s) are by weight.

A natural sweetener includes, for example, but not limited to, sucrose, fructose, glucose, high fructose corn syrup, *Stevia rebaudiana* compositions including pure components of Reb A, stevioside, and rebaudioside D (Reb D), xylose, arabinose, or rhamnose, as well as sugar alcohols such as erythritol, xylitol, mannitol, sorbitol, inositol and a combination thereof. An artificial sweetener includes, for example, but not limited to, aspartame, sucralose, neotame, acesulfame potassium, saccharin and a combination thereof.

A flavoring is a preparation that provides a consumable with a particular taste and/or smell. A flavoring with modifying properties is a subset of the flavoring. It is added to the consumable to reduce off-notes and/or improve overall profile. The flavorings with modifying properties of the present invention include, for example, but not limited to, a *stevia* composition including stevioside, steviolbioside Reb A, rebaudioside B (Reb B), rebaudioside C (Reb C), Reb D, rebaudioside E (Reb E), rebaudioside F (Reb F), dulcoside A, dulcoside B, rubusoside, alpha-glucosyl *stevia*, fructosyl *stevia*, galactosyl *stevia*, beta-glucosyl *stevia*, siamenoside, mogroside IV, mogroside V, Luo Han Guo, monatin, glycyrrhizic acid, thaumatin, a salt thereof, a glycosylated derivative thereof and a combination thereof. The glycosylated derivatives can be prepared via transglycosylation reactions with, for example, but not limited to, glucose, fructose, galactose, rhamnose, ribose, mannose, arabinose, fucose, maltose, lactose, sucrose, rutinose, sorbose, xylulose, ribulose, rhammulose and xylose. In one embodiment, the flavorings with modifying properties of the present invention include Reb A, Reb C, rubusoside, Reb D, mogroside V, Luo Han Guo, monatin acid, a salt thereof, a glycosylated derivative thereof and a combination thereof. The flavorings with modifying properties of the present invention exhibit weak intrinsic sweetness. Some other flavorings of the present invention include, for example, but not limited to, curculin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, cyclocarioside I and a combination thereof.

Accordingly, the term "a sweetness modifier" of the present invention refers to a sweetener including a natural sweetener and an artificial sweetener or a flavoring with modifying properties set forth in the above.

The term "sweetness" or "sweetness intensity" is understood to mean the relative strength of sweet sensation as observed or experienced by an individual, e.g., a human, or a degree or amount of sweetness detected by a taster, for example on the scale from 0 (none) to 8 (very strong) used in sensory evaluations according to the procedure described in American Society for Testing Materials, Special Technical Publication-434: "Manual on Sensory Testing Methods," ASTM International, West Conshohocken, PA. (1996).

The term "olfactory effective amount" is understood to mean the amount of verbascoside or a related compound thereof used in a combination with a sweetness modifier, wherein verbascoside or a related compound thereof enhances the sweetness of the sweetness modifier. Its olfactory effective amount may vary depending on many factors including other ingredients, their relative amounts and the olfactory effect that is desired. Any amount of verbascoside or a related compound thereof that provides the desired degree of sweetness enhancement without exhibiting off-taste can be used. In certain embodiments, the olfactory effective amount ranges from about 1 ppb to about 1000 ppm by weight, preferably from about 2 ppb to about 100 ppm by weight and more preferably from about 5 ppb to about 10 ppm by weight. When used in the form of a botanical extract such as *Chaenomeles speciosa* leave extract, the olfactory effective amount ranges from about 100 ppb to about 1000 ppm by weight, preferably from about 1 to about 500 ppm by weight and more preferably from about 5 to about 200 ppm.

A consumable includes, for example, a food product (e.g., a beverage), a sweetener such as a natural sweetener or an artificial sweetener, a pharmaceutical composition, a dietary supplement, a nutraceutical, a dental hygienic composition and a cosmetic product. The consumable may further contain a flavoring.

In some embodiments, a consumable is a food product including, for example, but not limited to, fruits, vegetables, juices, meat products such as ham, bacon and sausage, egg products, fruit concentrates, gelatins and gelatin-like products such as jams, jellies, preserves and the like, milk products such as yogurt, ice cream, sour cream and sherbet, icings, syrups including molasses, corn, wheat, rye, soybean, oat, rice and barley products, nut meats and nut products, cakes, cookies, confectionaries such as candies, gums, fruit flavored drops, and chocolates, chewing gums, mints, creams, pies and breads. In a certain embodiment, the food product is a beverage including, for example, but not limited to, coffee, tea, carbonated soft drinks, such as COKE and PEPSI, non-carbonated soft drinks and other fruit drinks, sports drinks such as GATORADE and alcoholic beverages such as beers, wines and liquors. A consumable also includes prepared packaged products, such as granulated flavor mixes, which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. A consumable also includes diet or low-calorie food and beverages containing little or no sucrose. A preferred consumable includes carbonated beverages. Consumables further include condiments such as herbs, spices and seasonings, flavor enhancers (e.g., monosodium glutamate), dietetic sweeteners and liquid sweeteners.

In other embodiments, a consumable is a pharmaceutical composition, a dietary supplement, a nutraceutical, a dental hygienic composition or a cosmetic product. Preferred compositions are pharmaceutical compositions containing verbascoside or a related compound thereof, one or more pharmaceutically acceptable excipients, and one or more active agents that exert a biological effect other than sweetness enhancement. Such active agents include pharmaceutical and biological agents that have an activity other than taste enhancement. Such active agents are well known in the art (See, e.g., The Physician's Desk Reference). Such compositions can be prepared according to procedures known in the art, for example, as described in Remington's Pharmaceutical Sciences, Mack Publishing Co., Easton, PA. In one embodiment, such an active agent includes a bronchodilator, an anorexiant, an antihistamine, a nutritional supplement, a laxative, an analgesic, an anesthetic, an antacid, a H2-receptor antagonist, an anticholinergic, an antidiarrheal, a demulcent, an antitussive, an antinauseant, an antimicrobial, an antibacterial, an antifungal, an antiviral, an expectorant, an anti-inflammatory agent, an antipyretic and a mixture thereof. In another embodiment, the active agent is selected from the group consisting of an antipyretic and analgesic, e.g., ibuprofen, acetaminophen or aspirin, a laxative, e.g., phenolphthalein dioctyl sodium sulfosuccinate, an appetite depressant, e.g., an amphetamine, phenylpropanolamine, phenylpropanolamine hydrochloride, or caffeine, an antacid, e.g., calcium carbonate, an antiasthmatic, e.g., theophylline, an antidiarrheal, e.g., diphenoxylate hydrochloride, an agent against flatulence, e.g., simethecon, a migraine agent, e.g., ergotamine tartrate, a psychopharmacological agent, e.g., haloperidol, a spasmolytic or sedative, e.g., phenobarbital, an antihyperkinetic, e.g., methyldopa or methylphenidate, a tranquilizer, e.g., a benzodiazepine, hydroxyzine, meprobramate or phenothiazine, an antihistaminic, e.g., astemizol, chlorpheniramine maleate, pyridamine maleate, doxlamine succinate, brompheniramine maleate, phenyltoloxamine citrate, chlorcyclizine hydrochloride, pheniramine maleate, or phenindamine tartrate, a decongestant, e.g., phenylpropanolamine hydrochloride, phenylephrine hydrochloride, pseudoephedrine hydrochloride, pseudoephedrine sulfate, phenylpropanolamine bitartrate, or ephedrine, a beta-receptor blocker, e.g., propranolol, an agent for alcohol withdrawal, e.g., disulfuram, an antitussive, e.g., benzocaine, dextromethorphan, dextromethorphan hydrobromide, noscapine, carbetapentane citrate, and chlophedianol hydrochloride, a fluorine supplement, e.g., sodium fluoride, a local antibiotic, e.g., tetracycline or clindamycin, a corticosteroid supplement, e.g., prednisone or prednisolone; an agent against gout, e.g., colchicine or allopurinol, an antiepileptic, e.g., phenytoin sodium, an agent against dehydration, e.g., electrolyte supplements, an antiseptic, e.g., cetylpyridinium chloride, a NSAID, e.g., acetaminophen, ibuprofen, naproxen, or a salt thereof, a gastrointestinal active agent, e.g., loperamide and famotidine, an alkaloid, e.g., codeine phosphate, codeine sulfate, or morphine, a supplement for trace elements, e.g., sodium chloride, zinc chloride, calcium carbonate, magnesium oxide, and other alkali metal salts and alkali earth metal salts; a vitamin, an ion-exchange resin, e.g., cholestyramine, a cholesterol-depressant and lipid-lowering substance, an antiarrhythmic, e.g., N-acetylpro-cainamide and an expectorant, e.g., guaifenesin. Examples of dietary supplements or nutraceuticals include, for example, but are not limited to, an enteral nutrition product for treatment of nutritional deficit, trauma, surgery, Crohn's disease, renal disease, hypertension, obesity and the like, to promote athletic performance, muscle enhancement or general well-being or inborn errors of metabolism such as phenylketonuria. In particular, such compositions can contain one or more amino acids which have a bitter or metallic taste or aftertaste. Such amino acids include, for example, but are not limited to, an essential amino acid such as L isomers of leucine, isoleucine, histidine, lysine, methionine, phenylalanine, threonine, tryptophan, tyrosine and valine. Dental hygienic compositions are known in the art and include, for example, but not limited to, a toothpaste, a mouthwash, a plaque rinse, a dental floss, a dental pain reliever (such as ANBESOL) and the like. In one embodiment, the dental hygienic composition includes one natural sweetener. In another embodiment, the dental hygienic composition includes more than one natural sweetener. In yet another embodiment, the dental hygienic composition includes sucrose and corn syrup, or sucrose and aspartame. A cosmetic product includes, for example, but not limited to, a face cream, a lipstick, a lip gloss and the like. Other suitable cosmetic products of use in this invention include a lip balm, such as CHAPSTICK or BURT'S BEESWAX Lip Balm.

In addition, the present invention also provides methods for enhancing the sweetness of a flavoring with modifying properties and decreasing its use level in a consumable by incorporating verbascoside or a related compound thereof. In one embodiment, the invention provides a consumable containing an olfactory effective amount of verbascoside or a related compound hereof and a flavoring with modifying properties in a reduced amount in order to achieve the same level of sweetness when the flavoring with modifying properties is used alone in a traditional amount. In this respect, the amount of flavoring with modifying properties used in a consumable can be reduced by at least about 10%, 20%, 30%, 40%, 50%, 60%, 70%, 80%, 90%, or 95%, from about 60% to about 99% or from about 20% to about 50%.

As indicated, verbascoside or a related compound thereof can be used in a consumable as a sweetness enhancer, which retains a desired sweetness but contains lower amounts of a natural sweetener or an artificial sweetener. For example, an improved carbonated soft drink can be produced with the same sweetness as the known carbonated soft drink but with lower sugar content by adding verbascoside or a related compound thereof.

Additional materials can also be used in conjunction with verbascoside or a related compound thereof of the present invention to encapsulate and/or deliver the lingering aftertaste masking effect. Some well-known materials are, for example, but not limited to, polymers, oligomers, other non-polymers such as surfactants, emulsifiers, lipids including fats, waxes and phospholipids, organic oils, mineral oils, petrolatum, natural oils, perfume fixatives, fibers, starches, sugars and solid surface materials such as zeolite and silica. Some preferred polymers include polyacrylate, polyurea, polyurethane, polyacrylamide, polyester, polyether, polyamide, poly(acrylate-co-acrylamide), starch, silica, gelatin and gum Arabic, alginate, chitosan, polylactide, poly(melamine-formaldehyde), poly(urea-formaldehyde), or a combination thereof.

The following are provided as specific embodiments of the present invention. Other modifications of this invention will be readily apparent to those skilled in the art. Such modifications are understood to be within the scope of this invention. Materials were purchased from Aldrich Chemical Company unless noted otherwise. As used herein all percentages are weight percent unless otherwise noted, ppm is understood to stand for parts per million, L is understood to be liter, mL is understood to be milliliter, g is understood to be gram, Kg is understood to be kilogram, mol is understood to be mole, mmol is understood to be millimole, psig is understood to be pound-force per square inch gauge, and mmHg be millimeters (mm) of mercury (Hg). IFF as used in the examples is understood to mean International Flavors & Fragrances Inc., New York, NY, USA.

Example I: Preparation of Test Samples

*Chaenomeles speciosa* leave extract was purchased (Au-Nutra® Industries Inc., California, U.S.). Among different batches, ligustrosidic acid, 2'-hydroxy ligustrosidic acid, verbascoside and isoverbascoside were identified, ranging from ~0.1-1%, from ~0.2-2%, from ~0.2-2% and from ~0.01-0.4%, respectively.

In addition, individual compounds including verbascoside (Indofine Chemical Company, Inc., New Jersey, U.S.) and isoverbascoside (MedChemExpress, New Jersey, U.S.) were purchased.

Example II: Enhancement of Sucrose Sweetness

A sucrose solution (4%) was prepared in water. Each of verbascoside and isoverbascoside solutions of different concentrations was prepared in ethanol solution in water (50%). Verbascoside and isoverbascoside were evaluated at 1 and 200 ppm, respectively. Both were devoid of taste and smell.

The flavor profile of the sucrose solution with added verbascoside and isoverbascoside is reported in the following:

| Compound | | | | | |
|---|---|---|---|---|---|
| Verbascoside (ppm) | | | Isoverbascoside (ppm) | | |
| Concentration (ppm) | | | | | |
| 0.175 | 0.350 | 0.700 | 0.053 | 0.105 | 0.210 |
| Flavor Profile | | | | | |
| Slightly enhanced sweetness | Slightly enhanced sweetness | Slightly enhanced sweetness | Slight enhanced sweetness and mouthfeel | Enhanced mouthfeel | More sweetness and more mouthfeel |

Isoverbascoside enhanced overall mouthfeel. Verbascoside exhibited particular effect in sweetness enhancement.

Example III: Enhancement of Luo Han Guo Sweetness

A Luo Han Guo (Biovittoria Ltd., New Zealand) solution was prepared in water (120 ppm). Verbascoside and isoverbascoside solutions were prepared as above (EXAMPLE II). The flavor profile of the Luo Han Guo solution with added verbascoside and isoverbascoside is reported in the following:

| Compound | | | | | |
|---|---|---|---|---|---|
| Verbascoside (ppm) | | | Isoverbascoside (ppm) | | |
| Concentration (ppm) | | | | | |
| 0.175 | 0.350 | 0.700 | 0.053 | 0.105 | 0.210 |
| Flavor Profile | | | | | |
| Minimal effect, not much enhanced sweetness | Enhanced sweetness, did not mask off-taste | Slightly enhanced sweetness | Enhanced heaviness and viscosity, not much enhanced sweetness | Enhanced mouthfeel, masked off-taste | Enhanced mouthfeel, heavy, viscous, masked off-taste |

Isoverbascoside enhanced overall mouthfeel and suppressed Luo Han Guo's lingering off-taste. Verbascoside exhibited particular effect in sweetness enhancement.

Example IV: Preparation of Test Solutions

The effect of botanical extract such as *Chaenomeles speciosa* leave extract on sweetness was examined. Solutions of *Chaenomeles speciosa* leave extract containing ligustrosidic acid (0.61%), 2'-hydroxy ligustrosidic acid (0.62%), verbascoside (0.69%) and isoverbascoside (0.21%) were prepared in ethanol solution in water (50%) to obtain a series of concentrations ranging from 1 to 1000 ppm.

Solutions of sucrose (4%) and Luo Han Guo (120 ppm) were prepared as above (EXAMPLE II and III). In addition, solutions of fructose (3.4%), Reb A (GLG Life Tech Corporation, Canada) (90 ppm) and GSG (Glucosyl Steviol Glucosides, GLG Life Tech Corporation, Canada) (200 ppm) were also prepared in water.

The sweetness enhancement of (i) sucrose, (ii) Luo Han Guo, (iii) fructose, (iv) Reb A and (v) GSG by *Chaenomelea speciose* leave extract was evaluated, respectively. In all test groups, *Chaenomelea speciose* leave extract enhanced sweetness.

Example V: Enhancement of Sucrose Sweetness by Botanical Extract

The sucrose solution (4%) with the addition of various amount of *Chaenomeles speciosa* leave extract was evaluated. The flavor profile is as follows:

| Sample | Extract (ppm) | Flavor Profile |
|---|---|---|
| 1 | 0 (Base) | Mild in sweet perception |
| 2 | 1 | Very slight effect, started to display the perception of sugary syrup, slightly botanical, slightly enhanced mouthfeel |
| 3 | 10 | Natural fruit juice-like |
| 4 | 20 | Caramelized sugar-like, viscous mouthfeel |
| 5 | 50 | Long lasting and enhanced sweetness, pleasant sugary mouthfeel, sugar distillate-like |
| 6 | 100 | Maple syrup-like, brown and cooked sugar-like, mouth coating |
| 7 | 200 | More botanical and fruity sweetness, started to display off-taste and astringent note |
| 8 | 500 | More off-taste and astringent note started to overpower sweetness |
| 9 | 1000 | Woody, barky and astringent notes overpowered sweetness |

*Chaenomeles speciosa* leave extract enhanced sucrose mouthfeel starting at 1 ppm and sucrose sweetness at 10 ppm. However, undesirable off-taste started to develop at 500 ppm.

Example VI: Enhancement of Fructose Sweetness by Botanical Extract

The fructose solution (3.4%) with the addition of various amount of *Chaenomeles speciosa* leave extract was evaluated. The flavor profile is as follows:

| Sample | Extract (ppm) | Flavor Profile |
| --- | --- | --- |
| 1 | 0 (Base) | Mild in sweet perception |
| 2 | 1 | Slightly enhanced mouthfeel, slightly more mouth coating |
| 3 | 10 | More fruity, added body |
| 4 | 20 | Started to become sucrose-like, more body, more fullness |
| 5 | 50 | More sucrose-like, viscous, more mouth coating |
| 6 | 100 | Maple syrup-like, more mouth coating |
| 7 | 200 | Started to display off-taste and astringent note |
| 8 | 500 | More off-taste and astringent note started to overpower sweetness |
| 9 | 1000 | Woody, barky and astringent notes overpowered sweetness |

*Chaenomeles speciosa* leave extract provided sucrose-like flavor profile. *Chaenomeles speciosa* leave extract enhanced fructose sweetness, body and mouthfeel at all levels tested. However, undesirable off-taste started to develop at 500 ppm.

Example VII: Enhancement of Luo Han Guo Sweetness by Botanical Extract

The Luo Han Guo solution (120 ppm) with the addition of various amount of *Chaenomeles speciosa* leave extract was evaluated. The flavor profile is as follows:

| Sample | Extract (ppm) | Flavor Profile |
| --- | --- | --- |
| 1 | 0 (Base) | Mild in sweet perception |
| 2 | 1 | Some mouthfeel |
| 3 | 10 | Earlier onset sweetness, persistent mouthfeel helped to suppress bitterness |
| 4 | 20 | Upfront sweetness, upfront mouthfeel |
| 5 | 50 | Pleasant sweetness, less lingering bitterness, mouthfeel helped to suppress off-taste |
| 6 | 100 | Clear effect, more sucrose-like, less off-taste |
| 7 | 200 | Started to display off-taste |
| 8 | 500 | More off-taste started to overpower sweetness |
| 9 | 1000 | Woody, barky and astringent notes overpowered sweetness |

*Chaenomeles speciosa* leave extract provided sucrose-like flavor profile. *Chaenomeles speciosa* leave extract enhanced Luo Han Guo sweetness and masked lingering bitterness. However, undesirable off-taste started to develop at 500 ppm.

Example VIII: Enhancement of Reb A Sweetness by Botanical Extract

The Reb A solution (90 ppm) with the addition of various amount of *Chaenomeles speciosa* leave extract was evaluated. The flavor profile is as follows:

| Sample | Extract (ppm) | Flavor Profile |
| --- | --- | --- |
| 1 | 0 (Base) | Mild in sweet perception |
| 2 | 1 | Very slight effect |
| 3 | 10 | Slightly earlier onset of sweet perception, slightly increased mouthfeel, more body, less peakiness |
| 4 | 20 | Clear effect, enhanced sugary mouthfeel, more body, less lingering bitterness, less stevia's off-taste |
| 5 | 50 | Fruity sweetness, apple juice-like, enhanced mouthfeel |
| 6 | 100 | Sucrose-like, even more mouth fullness, pleasant mouth coating |
| 7 | 200 | Started to display off-taste |
| 8 | 500 | Woody and barky, still less stevia's off-taste, maple syrup-like |
| 9 | 1000 | Woody and barky, still less stevia's off-taste, maple syrup-like |

*Chaenomeles speciosa* leave extract enhanced Reb A sweetness and mouthfeel, and masked lingering bitterness and off-taste. However, undesirable off-taste started to develop at 500 ppm.

Example IX: Enhancement of GSG Sweetness by Botanical Extract

The GSG (Glucosyl Steviol Glucosides) solution (200 ppm) with the addition of various amount of *Chaenomeles speciosa* leave extract was evaluated. The flavor profile is as follows:

| Sample | Extract (ppm) | Flavor Profile |
| --- | --- | --- |
| 1 | 0 (Base) | Mild in sweet perception |
| 2 | 1 | Minimal effect |
| 3 | 10 | Very slight effect on sweetness, more mouthfeel |
| 4 | 20 | Very slight effect on sweetness, more mouthfeel |
| 5 | 50 | More sweetness, clearly enhanced mouthfeel |
| 6 | 100 | Enhanced sweetness and mouthfeel |
| 7 | 200 | Maple syrup-like with sugary mouthfeel, started to display astringent note |
| 8 | 500 | Maple syrup-like, astringent |
| 9 | 1000 | Woody and barky |

*Chaenomeles speciosa* leave extract enhanced glucosyl steviol glucosides sweetness and mouthfeel. However, undesirable off-taste started to develop at 500 ppm.

Example X: Sweetness Enhancement of Sucrose-Containing Yogurt

A Dannon Non-Fat Plain Yogurt with 6% sucrose was prepared and used as the base. Different amount of *Chaenomeles speciosa* leave extract was added to the base. Flavor profile was evaluated and is as follows:

| Sample | Extract (ppm) | Flavor Profile |
| --- | --- | --- |
| 1 | 0 (Base) | Mild in sweet perception |
| 2 | 1 | Slightly more and lingering sweetness, less sour perception |
| 3 | 10 | More sweetness |
| 4 | 20 | Upfront sweetness, jammy, creamy, mouthwatering and pleasant, waxy and cardboard-like notes decreased |
| 5 | 50 | Cooked sugar-like |
| 6 | 100 | Sweet, mouth coating and thick, less sourness |

-continued

| Sample | Extract (ppm) | Flavor Profile |
|---|---|---|
| 7 | 200 | Intense sweetness, viscous, slight brown sugar note developed |
| 8 | 500 | Maple syrup-like, woody |
| 9 | 1000 | Woody and barky, more brown sugar note developed |

*Chaenomeles speciosa* leave extract enhanced the sweetness of sucrose-containing yogurt and reduced its sourness. However, undesirable off-taste started to develop at 1000 ppm.

Example XI: Sweetness Enhancement of GSG-Containing Yogurt

A Dannon Plain Nonfat Yogurt with GSG (600 pm) was prepared and used as the base. Different amount of *Chaenomeles speciosa* leave extract was added to the base. Flavor profile was evaluated and is as follows:

| Sample | Extract (ppm) | Flavor Profile |
|---|---|---|
| 1 | 0 (Base) | Mild in sweet perception |
| 2 | 1 | Less sour perception |
| 3 | 10 | Slightly enhanced mouthfeel, less sourness and less steviol's off-taste |
| 4 | 20 | Enhanced upfront sweetness, rounded flavor profile |
| 5 | 50 | Enhanced upfront sweetness, mouthwatering, less steviol's off-taste, pleasant |
| 6 | 100 | Less steviol's off-taste |
| 7 | 200 | Slight brown sugar note developed, cooked sugar-like |
| 8 | 500 | Maple syrup-like |
| 9 | 1000 | Woody and barky |

*Chaenomeles speciosa* leave extract enhanced the sweetness and mouthfeel of GSG-containing yogurt.

Example XII: Sweetness Enhancement of Cane Sugar-Containing Yogurt

Different amount of *Chaenomeles speciosa* leave extract was added to Dannon Danimals Smoothies Yogurt Drink (Strawberry Explosion), which contained 9% cane sugar. Flavor profile was evaluated and is as follows:

| Sample | Extract (ppm) | Flavor Profile |
|---|---|---|
| 1 | 0 (Base) | Mild in sweet perception |
| 2 | 1 | Intense sweetness and mouthfeel, creamier |
| 3 | 10 | More sweetness, more natural strawberry flavor, creamier, more fat perception, less plastic-like note |
| 4 | 20 | More and lingering sweetness, creamier, more fat perception |
| 5 | 50 | Significant mouth coating, more fat perception |
| 6 | 100 | Upfront sweetness |
| 7 | 200 | More overall sweetness, pleasant with no off-taste of the extract |
| 8 | 500 | Maple syrup-like sweetness |
| 9 | 1000 | Brown sugar-like, barky note overpowered the base flavor |

*Chaenomeles speciosa* leave extract enhanced the sweetness and mouthfeel of cane sugar-containing yogurt at all levels tested.

What is claimed is:

1. A method of enhancing the sweetness of a sweetness modifier comprising the step of adding to the sweetness modifier an olfactory effective amount of isoverbascoside,
    wherein the sweetness modifier is selected from the group consisting of sucrose, fructose, glucose, high fructose corn syrup, rebaudioside A, stevioside, rebaudioside D, xylose, arabinose, rhamnose, erythritol, xylitol, mannitol, sorbitol, inositol, aspartame, sucralose, neotame, acesulfame potassium, saccharin, steviolbioside, rebaudioside B, rebaudioside C, rebaudioside E, rebaudioside F, dulcoside A, dulcoside B, rubusoside, alpha-glucosyl *stevia*, fructosyl *stevia*, galactosyl *stevia*, beta-glucosyl *stevia*, siamenoside, mogroside IV, mogroside V, Luo Han Guo, monatin, glycyrrhizic acid, thaumatin, a salt thereof, a glycosylated derivative thereof and a combination thereof;
    wherein the olfactory effective amount is from about 1 ppb to about 100 ppm; and wherein isoverbascoside is provided as a *Chaenomeles speciose* leaf extract.

2. The method of claim 1, wherein the olfactory effective amount is from about 2 ppb to about 100 ppm.

3. The method of claim 1, wherein the olfactory effective amount is from about 5 ppb to about 50 ppm.

4. A composition comprising a sweetness modifier and an olfactory effective amount of isoverbascoside,
    wherein the sweetness modifier is selected from the group consisting of sucrose, fructose, glucose, high fructose corn syrup, rebaudioside A, stevioside, rebaudioside D, xylose, arabinose, rhamnose, erythritol, xylitol, mannitol, sorbitol, inositol, aspartame, sucralose, neotame, acesulfame potassium, saccharin, steviolbioside, rebaudioside B, rebaudioside C, rebaudioside E, rebaudioside F, dulcoside A, dulcoside B, rubusoside, alpha-glucosyl *stevia*, fructosyl *stevia*, galactosyl *stevia*, beta-glucosyl *stevia*, siamenoside, mogroside IV, mogroside V, Luo Han Guo, monatin, glycyrrhizic acid, thaumatin, a salt thereof, a glycosylated derivative thereof and a combination thereof;
    wherein the olfactory effective amount of isoverbascoside enhances the sweetness of the sweetness modifier;
    wherein the olfactory effective amount is from about 1 ppb to about 1000 ppm; and wherein isoverbascoside is provided as a *Chaenomeles speciose* leaf extract.

5. The composition of claim 4, wherein the olfactory effective amount is from about 2 ppb to about 100 ppm.

6. The composition of claim 4, wherein the olfactory effective amount is from about 5 ppb to about 10 ppm.

7. A consumable comprising a sweetness modifier and an olfactory effective amount of isoverbascoside,
    wherein the sweetness modifier is selected from the group consisting of sucrose, fructose, glucose, high fructose corn syrup, rebaudioside A, stevioside, rebaudioside D, xylose, arabinose, rhamnose, erythritol, xylitol, mannitol, sorbitol, inositol, aspartame, sucralose, neotame, acesulfame potassium, saccharin, steviolbioside, rebaudioside B, rebaudioside C, rebaudioside E, rebaudioside F, dulcoside A, dulcoside B, rubusoside, alpha-glucosyl *stevia*, fructosyl *stevia*, galactosyl *stevia*, beta-glucosyl *stevia*, siamenoside, mogroside IV, mogroside V, Luo Han Guo, monatin, glycyrrhizic acid, thaumatin, a salt thereof, a glycosylated derivative thereof and a combination thereof;
    wherein the olfactory effective amount of isoverbascoside enhances the sweetness of the sweetness modifier;
    wherein the olfactory effective amount is from about 1 ppb to about 1000 ppm; and wherein the consumable is a food product and wherein isoverbascoside is provided as a *Chaenomeles speciose* leaf extract.

* * * * *